US010887862B2

(12) United States Patent
Raghothaman (10) Patent No.: US 10,887,862 B2
(45) Date of Patent: Jan. 5, 2021

(54) LOCATION DETERMINATION IN A CLOUD RADIO ACCESS NETWORK UTILIZING IMAGE DATA

(71) Applicant: CommScope Technologies LLC, Hickory, NC (US)

(72) Inventor: Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/783,479

(22) Filed: Feb. 6, 2020

(65) Prior Publication Data
US 2020/0260403 A1 Aug. 13, 2020

Related U.S. Application Data

(60) Provisional application No. 62/804,570, filed on Feb. 12, 2019.

(51) Int. Cl.
*H04W 24/00* (2009.01)
*H04W 64/00* (2009.01)
(Continued)

(52) U.S. Cl.
CPC ......... *H04W 64/003* (2013.01); *G01S 5/0252* (2013.01); *G06K 9/00161* (2013.01);
(Continued)

(58) Field of Classification Search
CPC .... H04W 64/003; H04W 4/029; G06N 20/00; G01S 4/02452; G06K 9/00161; H04L 5/005
(Continued)

(56) References Cited

U.S. PATENT DOCUMENTS

2013/0188878 A1* 7/2013 Kacenjar ................. G06T 5/003
382/209
2013/0324089 A1* 12/2013 Kim .................... G06F 21/6218
455/411
(Continued)

FOREIGN PATENT DOCUMENTS

KR  20110061767 A  6/2011

OTHER PUBLICATIONS

International Searching Authority, "International Search Report and Written Opinion from PCT Application No. PCT/US2020/016948", from Foreign Counterpart to U.S. Appl. No. 16/783,479, dated Jun. 3, 2020, p. 1 through 10, Published: WO.
(Continued)

*Primary Examiner* — Danh C Le
(74) *Attorney, Agent, or Firm* — Fogg & Powers LLC (57) ABSTRACT

A communication system that provides wireless service to at least one wireless device is provided. The communication system includes a baseband controller communicatively coupled to a plurality of radio points and at least one image capture device at a site. The baseband controller is configured to determine a signature vector for a wireless device associated with a first user. The communication system also includes a machine learning computing system configured to determine an image-based location of the first user based on image data from the at least one image capture device. The communication system is also configured to determine mapping data that associates the signature vector with the image-based location of the first user.

22 Claims, 6 Drawing Sheets

(51) Int. Cl.
*H04W 4/029* (2018.01)
*G06N 20/00* (2019.01)
*H04L 5/00* (2006.01)
*G01S 5/02* (2010.01)
*G06K 9/00* (2006.01)

(52) U.S. Cl.
CPC ......... *G06K 9/00664* (2013.01); *G06N 20/00* (2019.01); *H04L 5/005* (2013.01); *H04W 4/029* (2018.02)

(58) Field of Classification Search
USPC ................... 455/456.1, 456.5, 550.1, 418
See application file for complete search history.

(56) References Cited

U.S. PATENT DOCUMENTS

| | | | |
|---|---|---|---|
| 2013/0343615 A1* | 12/2013 | Zhang | G06K 9/00664 382/111 |
| 2014/0179341 A1 | 6/2014 | Sydir et al. | |
| 2016/0037550 A1* | 2/2016 | Barabell | H04B 17/318 455/450 |
| 2018/0329892 A1* | 11/2018 | Lubbers | G06K 9/627 |
| 2018/0332614 A1* | 11/2018 | Shanmugaraju | H04W 76/27 |
| 2018/0349727 A1 | 12/2018 | Moshfeghi | |
| 2019/0174345 A1* | 6/2019 | Xing | H04W 72/12 |
| 2019/0230179 A1* | 7/2019 | Carver | H04L 67/1093 |
| 2019/0380097 A1* | 12/2019 | Raghothaman | H04W 52/343 |
| 2020/0111267 A1* | 4/2020 | Stauber | G06K 9/6211 |
| 2020/0156246 A1* | 5/2020 | Srivastav | G06K 9/00201 |
| 2020/0193589 A1* | 6/2020 | Peshlov | B64C 39/02 |

OTHER PUBLICATIONS

Xiao et al., "Learning the Localization Function: Machine Learning Approach to Fingerprinting Localization", Mar. 2018, p. 1 through 30, Institute for Theoretical Information Technology, RWTH Aachen University.
Yu et al., "A Guide of Fingerprint Based Radio Emitter Localization using Multiple Sensors", Oct. 2018, p. 1 through 18, retrieved on May 18, 2020.
Bapat, Anil et al., "Dynamic Sectorization in a System With Multiple Cloud Radio Access Networks", U.S. Appl. No. 16/674,566, filed Nov. 5, 2019, pp. 1-54, Published: US.
Bapat, Anil et al., "Location Determination With a Cloud Radio Access Network", U.S. Appl. No. 16/674,547, filed Nov. 5, 2019, pp. 1-47, Published: US.
Shanmuharaju, Naveen et al., "Dynamic Quantized Signature Vector Selection for a Cloud Radio Access Network", U.S. Appl. No. 16/674,587, filed Nov. 5, 2019, pp. 1-42, Published: US.

* cited by examiner

LOCATION DETERMINATION IN A CLOUD RADIO ACCESS NETWORK UTILIZING IMAGE DATA

CROSS-REFERENCE TO RELATED APPLICATIONS

This application claims priority to U.S. Provisional Patent Application No. 62/804,570 entitled "LOCATION DETERMINATION IN A CLOUD RADIO ACCESS NETWORK UTILIZING IMAGE DATA" filed on Feb. 12, 2019, which is incorporated by reference in its entirety.

BACKGROUND

Location-based services may be used in a variety of contexts. It may be desirable to determine locations of wireless devices indoors without imposing additional requirements on the wireless devices or user behavior. Furthermore, many sites (e.g., buildings) may include cameras that capture images of the site. Accordingly, the present systems and methods describe location determination in a cloud radio access network (C-RAN) utilizing image data.

SUMMARY

A communication system that provides wireless service to at least one wireless device is provided. The communication system includes a baseband controller communicatively coupled to a plurality of radio points and at least one image capture device at a site. The baseband controller is configured to determine a signature vector for a wireless device associated with a first user. The communication system also includes a machine learning computing system configured to determine an image-based location of the first user based on image data from the at least one image capture device. The communication system is also configured to determine mapping data that associates the signature vector with the image-based location of the first user.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

Location-based services may be used in a variety of contexts, including indoor locations. Conventional techniques for indoor location determination may rely on modeling indoor locations. However, it is very difficult to explicitly model indoor radio propagation environments due to the non-homogeneity of obstructions like walls, furniture etc. As a result, using such model-based approaches may not yield accurate results. Accordingly, attempting to model every path loss possibility of an indoor space is impractical and/or impossible. Instead, machine learning models may be used that don't require explicit modeling of indoor locations.

The term Radio Access Network (RAN) refers to the part of a mobile communication network that connects wireless devices to fixed network infrastructure through wireless radio channels, over specific radio frequencies. A cloud radio access network (C-RAN) is a point-to-multipoint distributed base station with one or more baseband controllers that are physically separated from, and communicatively coupled to, multiple radio points (RPs).

C-RANs may perform Sounding Reference Signal (SRS)-based localization to determine the set of Radio-Points (RPs) that form a cell (e.g., a virtual cell) for a user. However, a radio frequency (RF) signature/fingerprint (e.g., a signature vector) alone indicates an RF location, not a physical location. Therefore, in order to determine a physical location, a wireless system may further utilize data that maps RF signatures to physical locations. This data must be tailored to each system (e.g., C-RAN) deployment and cannot be predetermined across all deployments.

One possible way to determine this mapping data is with a manual walk-test, e.g., during early-deployment days at a C-RAN site. For example, a tester may walk around the deployment site tagging his or her current location into a mobile application running on a testing device. At such time, the testing device may generate location data and transmit a training signal to the RPs in the C-RAN. The training signal (received at the RPs) may be used to determine a signature vector, which can later be associated with the location data. However, this manual technique is often expensive (requiring at least one tester to visit many physical locations at a C-RAN site), and therefore may be impractical in some cases.

Accordingly, the present systems and methods may automatically generate the mapping data that pairs RF signatures/fingerprints (e.g., signature vectors) to physical locations in a site. Specifically, a communication system may utilize image-based data to determine a user's/wireless device's physical location within the site. At the same time (or nearly the same time), a signature vector may be determined for the user/wireless device at the site, e.g., based on SRSs received at the RPs from the user/wireless device. The image-based physical location may then be associated with the signature vector. This process may be repeated for many physical locations in the site, thus forming mapping data that can be used to determine a user's/wireless device's physical location based on an RF signature/fingerprint (e.g., signature vector).

The present systems and methods have many of the same advantages as the manual training described above. For example, it can be performed in a transparent manner without imposing additional requirements on the wireless devices or user behavior, e.g., a wireless device need not have Wi-Fi or Bluetooth enabled, nor would it require an RFID tag (or other sensor for location tracking).

However, unlike the manual training, the present systems and methods do not require a trained technician to manually tag many physical locations around a deployment site. Rather, any user(s) moving around the site may be used to create the training data, e.g., cleaning staff. This may reduce training time and/or cost compared to manual training.

Figure 1A:
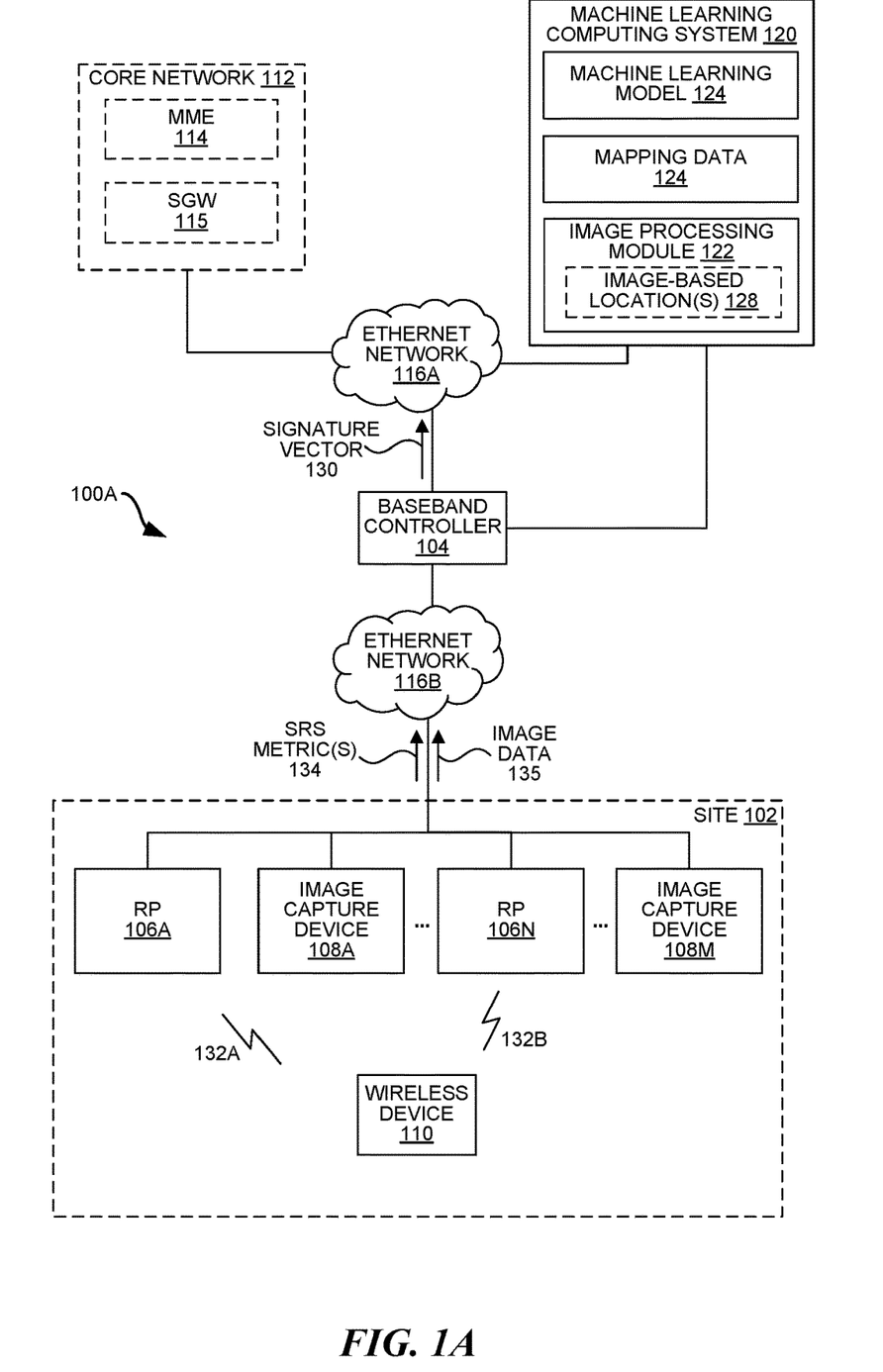
FIG. 1A is a block diagram illustrating an exemplary configuration of a system during a training phase.
Figure 1B:
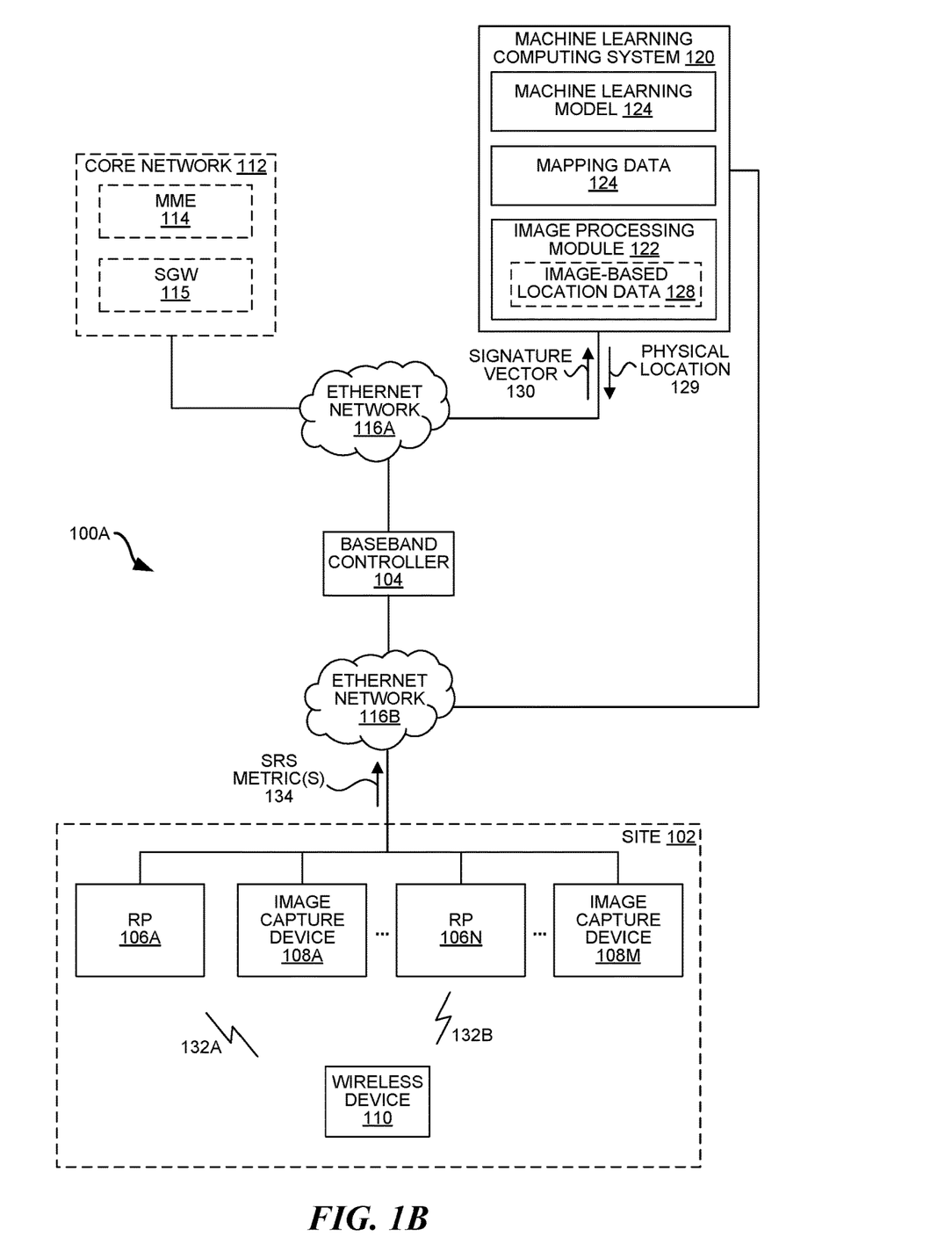
FIG. 1B is a block diagram illustrating an exemplary configuration of a system during an online phase.

FIGS. 1A-1B are block diagrams illustrating exemplary configurations of a system 100A for indoor location determination and/or tracking. The system 100A is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially (and optionally entirely) indoors, but other alternatives are possible.

In the exemplary configuration shown in FIGS. 1A-1B, the system 100A is implemented using the cloud radio access network (C-RAN) (point-to-multipoint distributed base station) architecture that employs at least one (and optionally multiple) baseband unit 104 and multiple (e.g., N=2-100) radio points (RPs) 106A-N that serve at least one cell. In 5G examples, an RP 106 can be a mix of a Digital Unit (DU) and a Radio Unit (RU).

The system 100A may also be referred to here as a "C-RAN," "C-RAN system," and/or an "eNodeB" (or "eNB"). The baseband unit 104 is also referred to here as "baseband controller" 104 or just "controller" 104. Each RP 106 may include or be coupled to at least one (e.g., two) antennas used to radiate downlink RF signals to wireless devices 110 and receive uplink RF signals transmitted by wireless devices 110. The baseband controller 104 may optionally be physically located remotely from the RPs 106, e.g., in a centralized bank of baseband controller 104. Additionally, the RPs 106 may be physically separated from each other within the site 102, although they are each communicatively coupled to the baseband controller 104.

Each wireless device 110 may be a computing device with a processor that executes instructions stored in memory, e.g., a mobile phone such as a user equipment (UE), tablet computer, mobile media device, mobile gaming device, laptop computer, vehicle-based computer, a desktop computer, etc. It should be noted that while some of the techniques herein are described with a single wireless device 110, many wireless devices 110 may be present at the site 102 and located and/or tracked.

The system 100A is coupled to a core network 112 of each wireless network operator over an appropriate back-haul ETHERNET network 116A. For example, the Internet may be used for back-haul between the system 100A and each core network 112. However, it is to be understood that the back-haul ETHERNET network 116A can be implemented in other ways. The ETHERNET networks 116 described herein may be implemented with one or more switches, routers, and/or other networking devices.

The system 100A may be implemented as a Long Term Evolution (LTE) radio access network providing wireless service using the LTE air interface. However, it should be noted that the present systems and methods may be used with other wireless protocols, e.g., 5G. LTE is a standard developed by 3GPP standards organization. In this configuration, the baseband controller 104 and RPs 106 together are used to implement an LTE Evolved Node B (also referred to here as an "eNodeB" or "eNB"). An eNB may be used to provide wireless devices 110 with mobile access to the wireless network operator's core network 112 to enable wireless device 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) 114 and a Serving Gateway (SGW) 115 and, optionally, a Home eNB gateway (HeNB GW) (not shown) and a Security Gateway (SeGW) (not shown).

Moreover, in an exemplary LTE configuration, each baseband controller 104 may communicate with the MME 114 and SGW 115 in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio point 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In the exemplary configurations shown in FIG. 1A-1B, the front-haul that communicatively couples each baseband controller 104 to the one or more RPs 106 is implemented using a standard ETHERNET network 116B. However, it is to be understood that the front-haul between the baseband controller 104 and RPs 106 can be implemented in other ways.

Data can be front-hauled between the baseband controller 104 and RPs 106 in other ways (for example, using front-haul interfaces and techniques specified in the Common Public Radio Interface (CPRI) and/or Open Base Station Architecture Initiative (OBSAI) family of specifications).

The Third Generation Partnership Project (3GPP) has adopted a layered model for the LTE radio access interface. Generally, some combination of the baseband controller 104 and RPs 106 perform analog radio frequency (RF) functions for the air interface as well as digital Layer 1, Layer 2, and Layer 3 (of the 3GPP-defined LTE radio access interface protocol) functions for the air interface. Any suitable split of L1-L3 processing (between the baseband controller 104 and RPs 106) may be implemented.

Although not shown, a management system may be communicatively coupled to the baseband controller 104 and RPs 106, for example, via the ETHERNET network 116A and the ETHERNET network 116B (in the case of the RPs 106). The management system may send and receive management communications to and from the baseband controller(s) 104, each of which in turn forwards relevant management communications to and from the RPs 106.

A machine learning computing system 120 may be communicatively coupled to the baseband controller 104 (e.g., via the ETHERNET network 116A) and the RPs 106 (e.g., via the ETHERNET network 116B). The machine learning computing system 120 may be a general-purpose computing device (e.g., server) equipped with at least one (and optionally more than one) graphics processing unit (GPU) for faster machine-learning-based processing. In one configuration, the machine learning computing system 120 is implemented in more than one physical housing, each with at least one GPU. The machine learning computing system 120 may serve machine-learning-based, data-driven services to the system 100A. The machine learning computing system 120 may also be the host for a machine learning model 124, e.g., that performs indoor location determination and/or tracking. The machine learning computing system 120 may be coupled to and serve a single system 100A or multiple systems 100A (e.g., each with at least one baseband controller 104 and multiple RPs 106) based on deployment needs and scale.

The machine learning computing system 120 may include an image processing module 122 that (1) receives image data 135 from at least one image capture device 108A-M (e.g., M=1-1000); and (2) determines image-based location(s) 128 based on the image data 135. For example, the image data 135 may include at least one image or video frame captured by the image capture device(s) 108 (e.g., camera(s)) installed at the site 102. At the least one image capture device 108 may utilize any image capture technology, e.g., optical, thermal, infrared, etc. Furthermore, each image capture device 108 may be a video camera and/or a still camera. The image data 135 may include a timestamp indicating the time of each image capture.

The at least one image capture device 108 may be part of a closed-circuit television (CCTV) system for the site 102. In one configuration, the site 102 is a building, and a CCTV system utilizes a plurality of cameras to monitor most or all of the indoor spaces of the building, e.g., 95%-100%.

Additionally, the machine learning computing system 120 may utilize at least one parameter derived from at least one signal (and/or the signal(s) themselves) received at the RPs 106 (from the wireless device 110). The signal(s) may include a Sounding Reference Signal (SRS) 132A-B and/or any other type of signal received at the RPs 106 from the wireless device(s) 110. Each wireless device 110 (connected to the system 100A) may periodically transmit an SRS 132 on the uplink, e.g., once every 80 ms or every 160 ms. The SRS interval may be determined dynamically based on the loading on the system 100A.

Upon receiving an SRS 132 from a connected wireless device 110, each RP 106 may report a power metric of the received SRS 132 to the baseband controller 104. A channel impulse response may also be determined each wireless device 110 using the SRS 132 transmission from the respective wireless device 110. Then, a signature vector 130 may be determined based on an SRS power metric and/or a channel impulse response for the wireless device 110 (as measured at each RP 106). Additionally, or alternatively, the signature vector 130 for a wireless device 110 may be based on: (1) the angle of arrival measured at different RPs 106, e.g., for an SRS 132; and/or (2) at least one previous signature vector 130 for the wireless device 110. A signature vector 130 may be determined (e.g., periodically) for each wireless device 110 connected to the system 100A.

The machine learning computing system 120 may use signature vector(s) 130 and image-based location(s) 128 to determine mapping data 124 for the system 100A. For example, the mapping data 124 may associate a particular image-based location 128 with a particular signature vector 130 from a wireless devices 110. The mapping data 124 may include associations for many physical locations within the site 102, e.g., gathered over time. The mapping data 124 may optionally be updated periodically.

The mapping data 124 may then be used to determine a wireless device's 110 physical location based on a wireless device's 110 signature vector 130. In other words, once the mapping data 124 is stored, the machine learning computing system 120 may determine a physical location that is associated with the wireless device's 110 signature vector 130 (without first determining an image-based location 128 for the wireless device 110).

Each baseband controller 104, RP 106, image capture device 108, and/or machine learning computing system 120 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each baseband controller 104, RP 106, image capture device 108, and/or machine learning computing system 120 can be implemented in other ways.

FIG. 1A is a block diagram illustrating an exemplary configuration of the system 100A in a training phase. The mapping data 124 may be determined during a training phase that takes place before, during, and/or after an online phase. The mapping data 124 may be determined during a single, contiguous period of time, or it may be determined initially then updated one or more times. The mapping data 124 may be determined based on image-based location(s) 128 and at least one signature vector 130 for at least one wireless device 110 connected to the system 100A.

The training phase can optionally be limited to times when the site 102 is sparsely populated. For example, the training may be performed after hours when only a single member of a cleaning staff is walking around with a cellphone in his or her pocket. However, training may also be performed when more than one person (possessing a wireless device 110) is at the site 102.

During training, the image capture devices 108 may capture image data 135. For example, the image capture devices 108 may periodically capture images or video frames at different physical locations in the site 102. The image data 135 from each image capture device 108 may be transmitted via one or more ETHERNET networks 116 to the machine learning computing system 120. In some examples, the image data 135 is transmitted via one or more ETHERNET networks 116 without passing through the baseband controller 104.

The machine learning computing system 120 may include an image processing module 122 that is configured to process image data 135 (from the image capture devices 108) into image-based location(s) 128 during training. The image processing module 122 may determine an image-based location 128 by first identifying an individual person in the image data 135. In other words, the image processing module 122 may extract instances of uniquely-identifiable users from image data (e.g., CCTV footage), e.g., high-confidence instances where a single person is identified with one phone in one physical location. For example, the image processing module 122 may identify individual people using object detection and/or object tracking techniques that utilize image feature extraction and/or image feature classification (on the image data 135).

Once an individual person is identified in the image data 135, the image processing module 122 may determine a physical location of the person, e.g., based on the person's distance from other features in the image data 135, the location of the image capture device 108 that captured the image that the person appears in, etc. The person's physical location is saved as an image-based location 128.

The image-based locations 128 may take any suitable form. In one configuration, each image-based location 128 may be a pin in a map of the site 102, e.g., a floor number of a building and location within the floor. Alternatively, each image-based location 128 may include Cartesian coordinates, latitude/longitude, etc. Each image-based location 128 may have a timestamp indicating the time at which the image data 135 (used to determine the image-based location 128) was captured and/or the time at which the image-based location 128 was determined from the image data 135.

Also during training, RPs 106 may receive SRSs 132 from the wireless devices 110 connected to the system 100A. Each RP 106 may use relative SRS power (received at the respective RP 106) as an input to determine a "signature vector" (SV) 130 for the wireless device 110. A signature vector 130 may be a set of data that is based on one or more operating conditions in the system 100A, e.g., as it pertains to a wireless device 110. In one example, a signature vector may be used to, at least partially, characterize a physical location of a wireless device 110 and/or channel conditions at the physical location, e.g., the signature vector can be based on at least one signal and/or channel metric measured at multiple RPs 106. For example, the relative SRS power may be a signal-to-noise plus interference ratio (SNIR) metric. A signature vector 130 may be determined for each wireless device 110. For example, a signature vector 130 may be determined based on at least receive power measurements made at each of the RPs 106 for uplink transmissions (e.g., SRS 132) from the wireless device 110.

In addition to the relative SRS power, a channel impulse response for a wireless device 110 may also be used as input to determine the signature vector 130 for the wireless device 110. Indoor locations often produce rich multipath environments. So, the uplink SRS 132 sent by the wireless device 110 may reach the RPs 106 over multiple paths, which leads to multiple signal amplitudes measured with small delays. Accordingly, each RP 106 may measure these various signal amplitudes as well as the delay times and form a vector of these measurements, which is referred to as the channel impulse response of the SRS 132. Channel impulse response measurements of a wireless device's 110 SRS 132 from all the RPs 106 in the site 102 may be strongly correlated with the wireless device's 110 pinpointed location, taking into effect both the distances of the wireless device 110 from each RP 106 as well as the unique multipath characteristics of that particular location of the wireless device 110 relative to each RP 106. Utilizing the channel impulse responses (in addition to using an average SRS power from every RP 106) to determine a wireless device's 110 signature vector may increase accuracy of the indoor location determination and/or tracking.

Additionally, or alternatively, other inputs may be used to determine a signature vector 130 to further improve accuracy, including the angle of arrival measured at different RPs 106 (e.g., for an SRS 132) and/or at least one previous signature vector 130 for the wireless device 110. For example, at least one previous signature vector 130 with a strong correlation to a current position of the wireless device 110 may be used for training since the wireless device 110 will not have moved very far during an 80-160 ms SRS interval. The signal reception metrics that are determined based on the SRS transmissions 132 received at the RPs 106 (from a wireless device 110) may also be referred to as "SRS metrics" 134.

Each signature vector 130 for a wireless device 110 may be iteratively determined/updated (while that wireless device 110 is connected to the system 100A) based on SRSs 132 transmitted by the wireless device 110. For example, the signature vector for a wireless device 110 may be determined/updated every SRS interval, e.g., every 80-160 ms depending on system 100A loading. The signature vectors 130 may be determined (from the SRS metric(s)) at the baseband controller 104, at the RPs 106 and/or at the machine learning computing system 120. Each signature vector 130 may be a set of floating point signal-to-interference-plus-noise ratio (SINR) values (or other metric), with each value or element corresponding to a different RP 106 in the system 100A. Each signature vector 130 may be stored with an associated timestamp based on the time(s) that the SRS 132 was received at the RPs 106 (e.g., an average time) and/or the time at which the signature vector was 130 determined (from the SRS metric(s) 134).

Once a signature vector 130 is determined, it may be used to train a machine learning model 124. Specifically, at least one signature vector 130 may be paired (e.g., associated) with at least one corresponding image-based location 128 to form mapping data 124. Typically the mapping data 124 will include many such associations, e.g., for many physical locations in the site 102.

In scenarios where a single person is present at the site 102, the signature vectors 130 and image-based locations 128 may be paired together (e.g., associated with each other) based on their respective timestamps. In a first example (for a single person scenario), each image-based location 128 may be associated with the nearest-in-time signature vector 130, e.g., the signature vector 130 with a timestamp that is closest to a timestamp of the image-based location 128.

In a second example, a time threshold may be applied during pairing. For example, each image-based location 128 may be associated with the nearest-in-time signature vector 130 when the timestamp of the signature vector 130 is within a time threshold of the timestamp of the image-based location 128. In other words, an image-based location 128 may be associated with a signature vector 130 only if the signature vector's 130 timestamp is (1) closer to the image-based location's 128 timestamp than other signature vectors' 130 timestamps; and (2) within a time threshold of the image-based location's 128 timestamp.

In scenarios where more than one person is present at the site 102, the machine learning computing system 120 may further resolve any ambiguity present before pairing signature vectors 130 with image-based locations 128 (e.g., in addition to associating an image-based location 128 with a signature vector 130 based on timestamps and optionally a time threshold). For example, if multiple (e.g., two) unique users/people are identified at multiple (e.g., two) image-based locations 128, the machine learning computing system 120 may determine which of the multiple image-based locations 128 to associate with a particular signature vector 130. In these multiple person scenarios, a signature vector 130 may be paired with an image-based location 128 based on the location of the primary RP 106 in the signature vector 130 and/or the location of the image capture device 108 that captured the image data 135 used to determine the image-based location 128. Optionally, the training may be performed only if the number of users/people at the site 102 (e.g., as determined by image data 135) is less than a threshold number of users/people.

The RP 106 that corresponds to that "best" element in a signature vector 130 may be referred to as the "primary RP" 106 for the wireless device 110. The primary RP 106 may indicate the RP 106 receiving the strongest signal from a wireless device 110 and may, therefore, be correlated with the distance from the wireless device 110. In other words, the primary RP 106 is usually (but not always) the closest RP 106 to the wireless device 110. If multiple people are in separate areas of the site 102 (e.g., building), then the respective signature vectors 130 for the people's wireless devices 110 will typically have different primary RPs 106 which can separate them out. In other words, a signature vector 130 with a primary RP 106 that is closest to the image-based location 128 (among multiple signature vectors 130) may be associated with the image-based location 128 (in the mapping data 124).

In one configuration, a signature vector 130 may be paired with an image-based location 128 only if (1) the signature vector's 130 primary RP 106 is closer to the image-based location 128 than any other signature vector's 130 primary RP 106; and (2) the signature vector's 130 primary RP 106 is within a distance threshold to the image-based location 128. In some configurations, a signature vector 130 may not be associated with any image-based location 128 if the signature vector's 130 primary RP 106 is not within a distance threshold of any image-based location 128. In other words, the signature vector 130 may not be used in the training because it is too ambiguous.

Alternatively, the proximity of a signature vector's 130 primary RP 106 to the camera that captured the image data 135 (used to determine the image-based location 128) may be used to pair a signature vector 130 with an image-based location 128. In other words, a signature vector 130 with a primary RP 106 that is closest to the camera that captured the image data 135 (used to determine the image-based location 128) may be associated with the image-based location 128 (in the mapping data 124).

In one configuration, a signature vector 130 may be paired with an image-based location 128 only if (1) the signature vector's 130 primary RP 106 is closer to the camera that captured the image data 135 (used to determine the image-based location 128) than any other signature vector's 130 primary RP 106; and (2) the signature vector's 130 primary RP 106 is within a distance threshold to the camera that captured the image data 135 (used to determine the image-based location 128). In some configurations, a signature vector 130 may not be associated with any image-based location 128 if the signature vector's 130 primary RP 106 is not within a distance threshold of a camera that captured the image data 135 (used to determine any of the image-based locations 128). In other words, the signature vector 130 may not be used in the training because it is too ambiguous.

After the training phase, the machine learning model 124 may use the mapping data 124 to match a signature vector 130 to a physical location in a pattern-matching manner, e.g., without first determining an image-based location 128. The machine learning model 124 may be a K-Nearest Neighbor (kNN) model, a Support Vector Machine (SVM), or any other suitable model that employs machine learning.

FIG. 1B is a block diagram illustrating an exemplary configuration of the system 100A during an online phase. The online phase may refer to a mode of system 100A operation that occurs (after the training phase illustrated in FIG. 1A) when the physical location of at least one wireless device 110 (at the site 102) is determined and/or tracked. Additionally, or alternatively, the online phase may occur in parallel with (or overlapping with) a training phase.

Once the mapping data 124 has been determined during training, it may be used to match a new signature vector 130 of a wireless device 110 (measured across the various RPs 106) to a physical location (without first determining an image-based location 128 for the user/wireless device 110). Machine learning models 124 used herein may be more accurate and/or consistent than conventional triangulation methods that attempt to explicitly model the relation between radio measurements and physical location.

After entering the site 102 and connecting to the system 100A (e.g., including initial random access procedures), a wireless device 110 may periodically transmit a Sounding Reference Signal (SRS) 132A-C, e.g., every 80-160 ms. The SRS 132 may be received by at least one (e.g., all) RP(s) 106 in the system 100A. Each of the at least one RP 106 may extract at least one SRS metric 134 from the SRS 132. In some configurations, the extracted SRS metrics 134 include an SRS power measurement and/or a channel impulse response for the wireless device 110 (measured at each RP 106). Additionally, or alternatively, the SRS metric(s) may include: (1) the angle of arrival measured at different RPs 106, e.g., for the SRS 132; and/or (2) at least one previous signature vector 130 for the wireless device 110.

In some configurations, the SRS metric(s) 134 may be transmitted to the baseband controller 104, which aggregates the SRS metric(s) 134 and determines a signature vector 130 based on the SRS metric(s) 134. For example, the average SRS power and channel impulse response readings for an SRS signal from every RP 106 may be aggregated at a baseband controller 104 for a particular wireless device 110, then used to determine a signature vector 130 for the wireless device 110. After the signature vector 130 is determined, it may be transmitted to the machine learning computing system 120, e.g., via the back-haul ETHERNET network 116A.

The machine learning computing system 120 may use the signature vector 130 as input to the machine learning model 124 to determine a physical location 129 of the wireless device 110. For example, the machine learning model 124 may match the received signature vector 130 to a closest-matching signature vector 130 in the mapping data 124. The machine learning model 124 may identify a physical location 129 in the mapping data 124 using pattern-matching, e.g., where the signature vector 130 may be thought of as a multi-parameter pattern that is matched to a closest pattern of a signature vector 130 in the mapping data 124.

For example, the machine-learning methods discussed herein may model the mapping data 124 as millions or billions of "labeled" vectors in multidimensional space. When a new set of measurements (e.g., a new signature vector 130) is received, the model 124 may place this vector in the same multidimensional space and relate this vector to the "nearest" vectors, which are "labeled". Then, the label may be extracted based on the proximity of this new vector to the labeled vectors that form the mapping data 124.

In addition to locating a wireless device 110 within the site 102 (e.g., determining a user's physical location without knowledge of a user's previous physical location), the system 100A may also track a user, e.g., locating a wireless device's 110 current physical location, at least in part, based on a user's previous physical location. For example, once a wireless device 110 is located, tracking may be performed by inputting further measurements and/or at least one previous physical location 129 to the machine learning model 124.

In general, location tracking may match a sequence of signature vectors 130 to a sequence of physical locations. This may be more accurate/robust than locating the user based simply on current signature vector 130. Even if there are some errors in some signature vector 130 measurements, since the sequence of locations are strongly correlated to each other, such errors may not result in errors in physical location 129. For example, if consecutive physical locations 129 A,B,C are determined (and the sequence is not in the training data) and since location B is not actually near A,C, then the location sequence may be corrected to A-D-C.

Location determination and/or tracking described herein may enable various value-added services to be provided to an operator. An "operator" may be an owner, employee, supervisor, administrator, manager, property manager, technician, vendor, and/or any other person (and/or entity) with responsibility or access privileges for the system 100A and/or the site 102. In some configurations, a third-party services provider (not shown) may receive (e.g., via an application programming interface (API)) physical location(s) 129 for wireless device(s) 110 connected to the system 100A and/or information derived from the physical location(s) 129. Thereafter, the third-party services provider may provide value-added services to the operator. Alternatively, the operator itself may receive the physical location(s) 129 and provide the value-added services.

One type of value-added service is that real-time (or near real-time) location determination and/or tracking may be used to determine an accurate spatio-temporal heat map that describes one or more conditions of the system 100A and/or the site 102, e.g., channel conditions, traffic density, user density, and/or user movement patterns as a function of physical location and/or time. For example, the channel conditions experienced by wireless devices 110, their tonnage (e.g., traffic load on the system 100A), and/or their behavior may be determined and aggregated as a function of physical location and time to provide the operator a more complete description of network operations. The operator may then use this data to (1) appropriately configure the system 100A, e.g., install additional RPs 106, such as hotspot cells, at high density areas of the site 102; (2) optimize RP 106 placement, e.g., for regions having high traffic and sub-optimal channel conditions; and/or (3) re-draw sector boundaries, e.g., in response to high user movement in an area where a sector boundary occurs. It should be noted that a spatio-temporal heat map may be used for any suitable configuration, re-configuration, installation and/or other tasks associated with the system 100A and/or the site 102.

Another type of value-added service is that the physical location determination and/or tracking may be used for anonymous user (e.g., wireless device 110) movement pattern mining. The physical location(s) 129 may be inherently anonymous. In other words, a physical location 129 may indicate that a particular wireless device 110 is located at a certain point in the site 102 and/or is moving within the site 102, e.g., in a certain pattern. However, the physical location(s) 129 might not indicate an identity of the user of the wireless device 110. In other words, a physical location 129 is not associated with a phone number or even an international mobile subscriber identity (IMSI) (e.g., the permanent identifier of a user and/or wireless device 110 within an LTE network) of the wireless device 110. Rather, the system 100A may only be aware of a temporary identifier of the user/wireless device 102 called the cell radio network temporary identifier (C-RNTI), and a permanent identifier cannot be determined from the C-RNTI. Therefore, the physical location determination and tracking described herein may be inherently anonymous and ensure privacy of the user. Furthermore, the physical location(s) 129 (e.g., provided to a third-party services provider) may only describe that an anonymous user is located at point X and is moving to point Y at this point of time, without sharing any detail of the user.

Using the user movement pattern mining, an operator (or third-party services provider) may be able to determine which areas have the most users/wireless devices 110 at a given time of the day. This may be useful to a retail shop owner, for example, to know when and/or how to adjust on-site 102 advertising, promotions, and/or other offers. Using the user movement pattern mining may, an operator (or third-party services provider) may also be able to determine (1) if there is any cross-store visit correlation, e.g., a probability the user/wireless device 110 will enter a second area within the site 102 (e.g., store) given that they previously entered a first area within the site 102 (e.g., store) or whether a user/wireless device 110 entered two or three different stores together in a single visit. Such determinations may provide insight to an operator, e.g., of a retail site 102.

Another type of value-added service is that the physical location determination and/or tracking may be used for anomaly detection. By tracking real-time (or near real-time) user movement patterns, suspicious and/or anomalous movement patterns (e.g., that stray from normal established baselines by a threshold) may be detected. In one example, in an emergency scenario, many users/wireless devices 110 may frantically run around the site 102. In response, the site 102 operator (e.g., owner) and/or law enforcement may be alerted of a potential emergency. In another example, a site 102 operator (e.g., owner) and/or law enforcement may be alerted in response to identifying suspicious (e.g., abnormal) movement of one or more users/wireless devices 110 at unusual times (e.g., 4:00 AM).

It should be noted that, in addition to training, location determination, and/or location tracking, the signature vectors 130 described herein may optionally be used to determine an RP 106 having the best signal reception metric for a wireless device 110, e.g., by scanning or sorting the elements of the signature vector 130 to find the element having the best signal reception metric.

Furthermore, a secondary cell signature vector 130 may be determined based on a primary cell signature vector 130 and a physical location for a wireless device 110. Additionally or alternatively, coordinated beamforming vectors may be determined based on a physical location for a wireless device 110.

Optionally, a "quantized signature vector 130" (QSV) may also be determined for each wireless device 110. A "simulcast zone" may be a subset of RPs 106 in the system 100A that are used to transmit to a wireless device 110, e.g., each wireless device 110 may have a simulcast zone that may or may not overlap with a simulcast zone for another wireless device 110. The QSV for each wireless device 110, then, may be a vector that includes an element for each RP 106, where each element has one of a finite set of values. For example, the element for each RP 106 has a first value (for example, a value of "1") if the corresponding RP 106 is included in the simulcast zone for that wireless device 110 and has second value (for example, a value of "0") if the corresponding RP 106 is not included in the simulcast zone for that wireless device 110. The QSV for each wireless device 110 can be determined using the SV for that wireless device 110.

The QSVs for the wireless devices 110 may be used to conveniently determine if the simulcast zones of two wireless devices 110 do not include any of the same RPs 106. That is, the QSVs for two wireless devices 110 can be used to conveniently determine if the simulcast zones for the two wireless devices 110 are disjoint. If this is the case, the simulcast zones for the wireless devices 110 (and the wireless devices 110 themselves) are referred to as being "orthogonal" to each other. This can be done, for example, applying a logical "AND" operation on corresponding elements of the two QSVs.

Figure 1C:
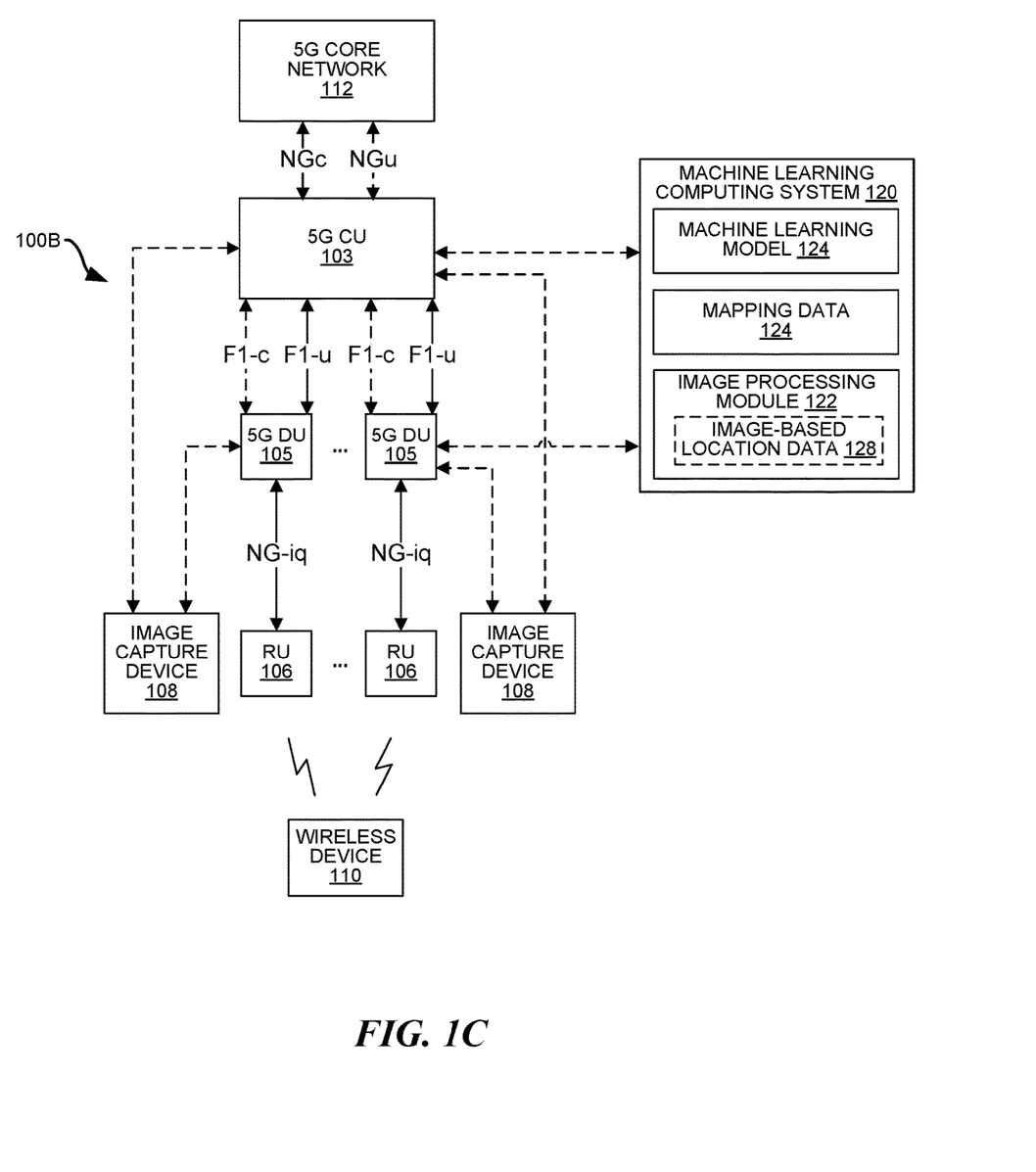
FIG. 1C is a block diagram illustrating another exemplary configuration of a system for indoor location determination and/or tracking.

FIG. 1C is a block diagram illustrating another exemplary configuration of a system 100B for indoor location determination and/or tracking. The system 100B includes Third Generation Partnership Project (3GPP) Fifth Generation (5G) components. Optionally, the system 100B may additionally include 4G components. Each of the components may be implemented using at least one processor executing instructions stored in at least one memory. In some configurations, at least some of the components are implemented using a virtual machine.

3GPP Fifth Generation (5G) standards support a wide variety of applications, bandwidth, and latencies while supporting various implementation options. In the system 100B, interfaces denoted with "-c" or simply "c" provide control plane connectivity, while interfaces denoted with "-u" or simply "u" provide user plane connectivity.

FIG. 1C illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105 and one or more 5G Remote Units (RU) 106. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105 over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1C, the C-RAN 100B implementing the example Next Generation NodeB (gNB) includes a single CU 103, which handles control plane functions and user plane functions. The 5G CU 103 (in the C-RAN 100B) may communicate with at least one wireless service provider's Next Generation Cores (NGC) 112, e.g., using NGc and NGu interfaces.

In some 5G configurations, the RUs (RUs) 106 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches. The RUs 106 communicate radio frequency (RF) signals with nearby wireless devices 110.

Any of the interfaces in FIG. 1C may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1C.

Where functionality of a baseband controller 104 is discussed herein, it may be equally applicable to a 5G CU 103 or 5G DU 105 in 5G configurations. Similarly, where functionality of an RP 106 is discussed herein, it is equally applicable to an RU 106 in 5G configurations. Therefore, where a C-RAN 100 is described herein, it may include 4G components (as in FIGS. 1A-B) and/or 5G components (as in FIG. 1C).

Furthermore, the system 100B may include a machine learning computing system 120 implementing similar functionality to the machine learning computing system 120 in the system 100A of FIGS. 1A-1B. Additionally, the system 100B may include image capture devices 108 that function similarly to the image capture devices 108 in the system 100A of FIGS. 1A-1B. The image capture devices 108 may be communicatively coupled to the DU(s) 105, the 5G CU 103, and/or the machine learning computing system 120.

Figure 2:
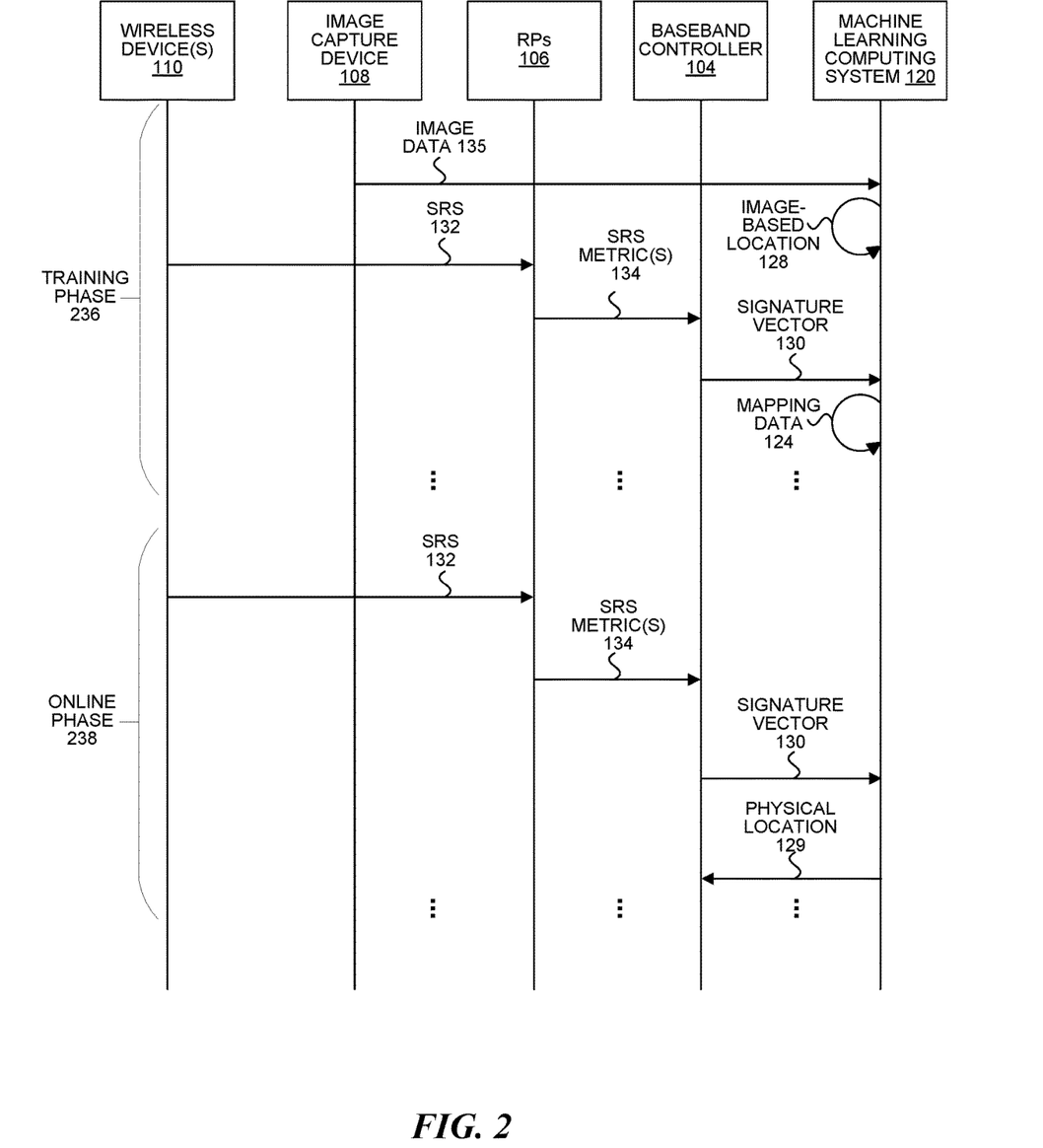
FIG. 2 is a sequence diagram illustrating signaling during a training phase and an online phase of a system.

FIG. 2 is a sequence diagram illustrating signaling during a training phase 236 and an online phase 238 of a system 100. The training phase 236 may occur before, during, and/or after the online phase 238. Additionally, there may be a significant gap in time between the training phase 236 and the online phase 238.

As described before, the system 100 may include multiple RPs 106 and at least one baseband controller 104. Additionally, a machine learning computing system 120 may implement a machine learning model 124 (e.g., based on SRS measurements) for physical location determination and/or tracking of wireless devices 110 at the site 102. Furthermore, the wireless device(s) 110 used during the training phase 236 may or may not also be used during the online phase 238. In other words, the training phase 236 may involve a first group of one or more wireless devices 110, and the online phase 238 may involve a second group of one or more wireless devices 110, which may or may not overlap with the first group.

During the training phase 236, at least one image capture device 108 may capture image data 135 of the site 102. The image data 135 may be transmitted to the baseband controller 104, then to the machine learning computing system 120.

An image processing module 122 (in the machine learning computing system 120) may determine an image-based location 128 by (1) identifying an individual person in the image data 135; and (2) determining a physical location of the person, e.g., based on the person's distance from other features in the image data 135, the location of the image capture device 108 that captured the image that the person appears in, etc. The person's physical location is saved as an image-based location 128. The image-based location 128 may have a timestamp.

Simultaneously (or nearly simultaneously) to the image data 135 being captured, the wireless device 110 may transmit an SRS 132 that is received by at least one of the RPs 106. The SRS 132 may be received by at least one (e.g., all) the RPs 106. In one configuration, the RPs 106 may receive the SRS 132, then transmit at least one SRS metric 134 characterizing the SRS 132 to the baseband controller 104. The SRS metric(s) 134 extracted by each receiving RP

106 may include one or more of the following: (1) an SRS power measurement; (2) a channel impulse response for the wireless device 110; (3) an angle of arrival for the SRS 132; and/or (4) at least one previous signature vector 130 for the wireless device 110. The baseband controller 104 may determine a signature vector 130 based on the received SRS metric(s) 134 and send it (along with the timestamp associated with the signature vector 130) to the machine learning computing system 120.

The machine learning computing system 120 may pair/associate the signature vector 130 with the image-based location 128 to form mapping data 124. When only a single person is present at the site 102, the signature vector 130 and image-based location 128 may be paired/associated together based on their respective timestamps (and optionally a threshold time). When more than one person is present at the site 102, the machine learning computing system 120 may further determine which of the multiple image-based locations 128 to associate with a particular signature vector 130. For example, the machine learning computing system 120 may determine a pairing/association based on the location of the primary RP 106 in the signature vector 130 and/or the location of the image capture device 108 that captured the image data 135 used to determine the image-based location 128.

Additionally, although not explicitly shown in FIG. 2, the training may be an iterative process. For example, after the image-based location 128 is paired/associated with signature vector 130, the process may be repeated for the wireless device 110 (or a different wireless device 110) at a different physical location.

During the online phase 238, after entering the site 102 and connecting to the system 100, a wireless device 110 may periodically transmit an SRS 132. The SRS 132 may be received by at least one (e.g., all) RP(s) 106 in the system 100, and each receiving RP 106 may extract at least one SRS metric 134 from the SRS 132. The SRS metric(s) 134 extracted by each receiving RP 106 may include one or more of the following: (1) an SRS power measurement; (2) a channel impulse response for the wireless device 110; (3) an angle of arrival for the SRS 132; and/or (4) at least one previous signature vector 130 for the wireless device 110. The baseband controller 104 may receive the SRS metric(s) 134 from each receiving RP, determine a signature vector 130 from the SRS metric(s) 134, and send the signature vector 130 to the machine learning computing system 120.

The machine learning computing system 120 may receive the signature vector 130 for the wireless device 130 and use it to determine a current physical location 129 of the wireless device 110. In other words, the machine learning model 124 in the machine learning computing system 120 may match the received signature vector 134 to a closest-matching signature vector 130 in the mapping data 124. The output may be a physical location 129 of the wireless device 110. The physical location 129 may be transmitted to the baseband controller 104 and/or a third-party services provider to enable various value-added services, e.g., spatio-temporal heat map generation, user movement pattern mining, and/or anomaly detection. The physical location 129 may take any suitable form, e.g., a floor number of a building and location within the floor. Optionally, the physical location 129 may include a timestamp.

Figure 3:
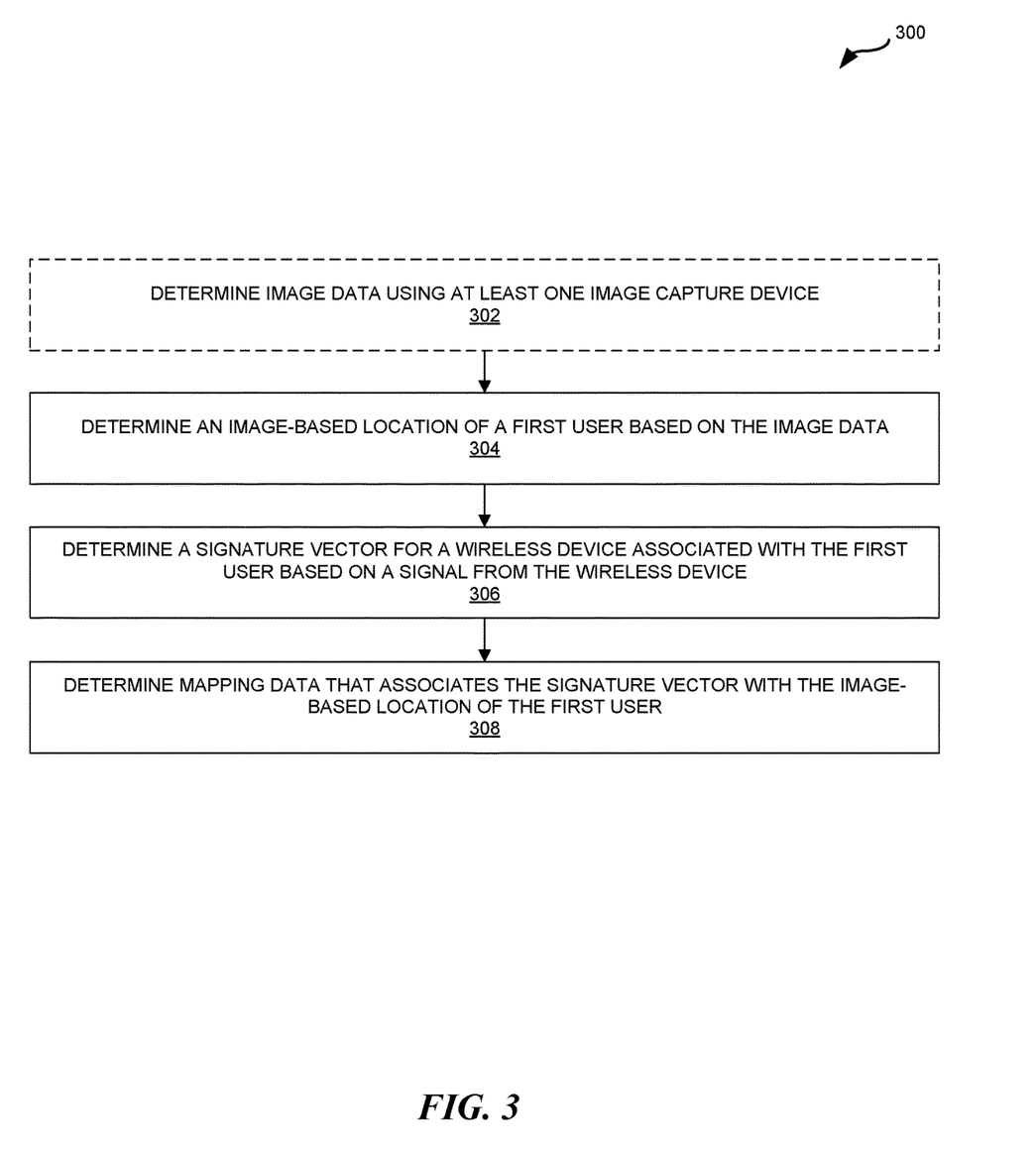
FIG. 3 is a flow diagram illustrating an exemplary method for determining mapping data for a machine learning model.

FIG. 3 is a flow diagram illustrating an exemplary method 300 for determining mapping data 124 for a machine learning model 124. The method 300 may be performed by at least a machine learning computing system 120 in a system 100 that includes multiple RPs 106 and at least one baseband controller 104 deployed at a site 102. The system 100 may also include at least one image capture devices 108 at the site 102.

The method 300 may be performed before, during, and/or after an online phase. The method 300 may be performed during a single, contiguous period of time, or it may be performed initially then updated where necessary. Optionally, the method 300 may be performed iteratively and/or in parallel instances for more than one physical location in the site 102. In other words, the method 300 may be performed for a plurality of physical locations in the site 102.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The method 300 begins in optional step 302 where image data 135 is determined using at least one image capture device 302. For example, the image data 135 may include at least one image or video frame captured by the image capture device(s) 108 (e.g., camera(s)) installed at the site 102. The image data 135 may include a timestamp indicating the time of each image capture. The at least one image capture device 108 may be part of a closed-circuit television (CCTV) system for the site 102. The image data 135 may be transmitted to the machine learning computing system 120 via the baseband controller 104.

The method 300 proceeds to step 304 where an image-based location 128 of a first user is determined based on the image data 135. It should be noted that machine learning computing system 120 does not know the identity of the first user when determining the image-based location 128. In other words, the machine learning computing system 120 is trying identify a high-confidence scenario a single person (any person) with one phone in one physical location, but the specific identify of the person is unknown (and irrelevant) at this stage.

For example, the machine learning computing system 120 may determine the image-based location 128 by first identifying an individual person (e.g., the first user) in the image data 135. The image processing module 122 may identify an individual person using image feature extraction and/or image feature classification (on the image data 135). Once first user is identified in the image data 135, the image processing module 122 may determine the image-based location 128 of the first user, e.g., based on the first user's distance from other features in the image data 135, the location of the image capture device 108 that captured the image that the first user appears in, etc.

The method 300 proceeds to step 306 where a signature vector is determined for a wireless device 110 associated with the first user based on a signal from the wireless device 110, e.g., that is received at least one RP 106. The signal may be an SRS or any other suitable uplink signal. The signal may be associated with a timestamp. Each of the at least one RP 106 (that receive the signal) may determine at least one SRS metric 134 based on the signal. The SRS metric(s) 134 extracted by each receiving RP 106 may include one or more of the following: (1) an SRS power measurement; (2) a channel impulse response for the wireless device 110; (3) an angle of arrival for the SRS 132; and/or (4) at least one previous signature vector 130 for the wireless device 110.

The signature vector 130 may be determined based on the at least one SRS metric 134 (from each of the at least one RPs 106). In some configurations, the RPs 106 may receive the signal, then each receiving RP 106 may determine and transmit at least one SRS metric 134 characterizing the signal to the baseband controller 104, which aggregates the SRS metric(s) 134 and determines the signature vector 130 using the SRS metric(s) 134. After the signature vector 130 is determined, the signature vector 130 (and optionally the timestamp associated with the signature vector 130) may be transmitted to the machine learning computing system 120, e.g., via the back-haul ETHERNET network 116A.

The method 300 proceeds to step 308 where mapping data 124 is determined that associates the signature vector 130 with the image-based location 128 of the first user. In scenarios where a single person is present at the site 102, the signature vector 130 and image-based location 128 may be paired together (e.g., associated with each other) based on their respective timestamps. Optionally, a time threshold may be applied to avoid inaccuracies. In examples where a time threshold is applied, the image-based location 128 may be associated with the signature vector 130 (in the mapping data 124) only if the signature vector's 130 timestamp is (1) closer to the image-based location's 128 timestamp than other signature vectors' 130 timestamps; and (2) within a time threshold of the image-based location's 128 timestamp.

In scenarios where multiple people are identified at multiple image-based locations 128 in the site 102, the machine learning computing system 120 may determine which of the multiple image-based locations 128 to associate with a particular signature vector 130. In multiple person scenarios, a signature vector 130 may be paired with an image-based location 128 based on the location of the primary RP 106 in the signature vector 130 and/or the location of the image capture device 108 that captured the image data 135 used to determine the image-based location 128, as described above. Optionally, a distance threshold may be applied to eliminate ambiguous data. In some examples where a distance threshold is applied, the signature vector 130 may be paired with the image-based location 128 only if (1) the signature vector's 130 primary RP 106 is closer to the image-based location 128 than any other signature vector's 130 primary RP 106; and (2) the signature vector's 130 primary RP 106 is within a distance threshold to the image-based location 128. In other examples, the signature vector 130 may be paired with the image-based location 128 only if (1) the signature vector's 130 primary RP 106 is closer to the camera that captured the image data 135 (used to determine the image-based location 128) than any other signature vector's 130 primary RP 106; and (2) the signature vector's 130 primary RP 106 is within a distance threshold to the camera that captured the image data 135 (used to determine the image-based location 128).

The mapping data 124 may be used by a machine learning model 124 during an online phase. The machine learning model 124 may be a K-Nearest Neighbor (kNN) model, a Support Vector Machine (SVM), or any other suitable model that employs machine learning.

Figure 4:
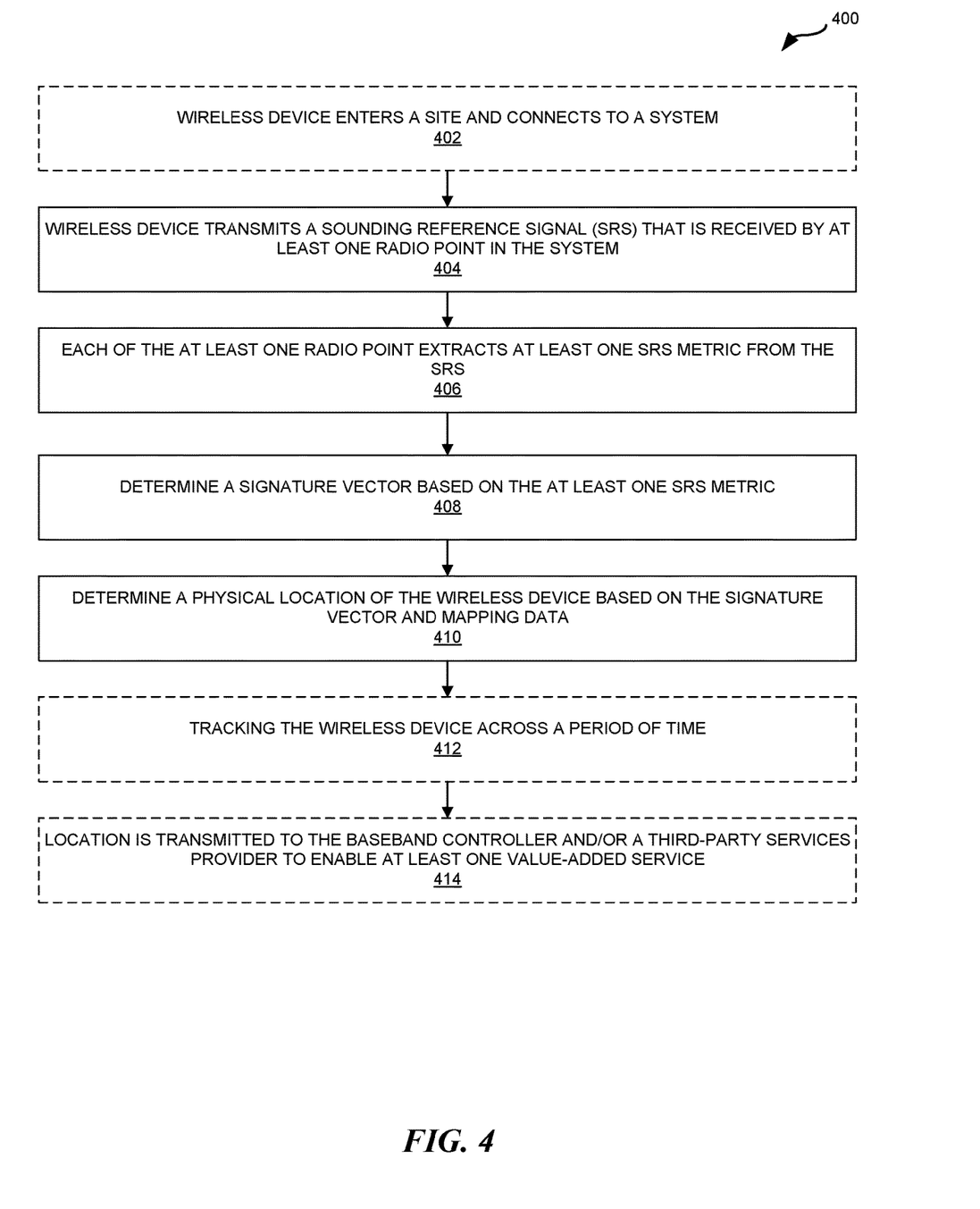
FIG. 4 is a flow diagram illustrating an exemplary method for determining and/or tracking a physical location of a wireless device in a site.

FIG. 4 is a flow diagram illustrating an exemplary method 400 for determining and/or tracking a physical location of a wireless device 110 in a site 102. The method 400 may be performed by at least a machine learning computing system 120 in a system 100 that includes multiple RPs 106 and at least one baseband controller 104 deployed at a site 102. The system 100 may also include at least one image capture devices 108 at the site 102.

The method 400 may be performed before, during, and/or after a training phase, e.g., described in FIG. 3. In some configurations, the method 400 may be performed iteratively and/or in parallel instances for more than one wireless device 110 at the site 102. For example, the method 400 may be performed at least once for each of a plurality of wireless devices 110 at the site 102. For example, the method 400 may be performed every SRS interval per wireless device 110, e.g., every 80-160 ms depending on system 100 load.

Furthermore, the wireless device(s) 110 used during the training phase 236 may or may not also be used during the online phase 238. For example, the training phase 236 may involve a first group of one or more wireless devices 110 and the online phase 238 may involve a second group of one or more wireless devices 110 that may or may not overlap with the first group.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

The method 400 begins in optional step 402 where a wireless device 110 enters a site 102 and connects to a system 100 (e.g., including initial random access procedures). The method 400 proceeds to step 404 where the wireless device 110 may transmit a Sounding Reference Signal (SRS) 132 (e.g., periodically every 80-160 ms) that is received by at least one RP 106 in the system 100.

The method 400 proceeds to step 406 where each of the at least one RP 106 extracts at least one SRS metric 134 from the SRS 132. The SRS metric(s) 134 extracted by each receiving RP 106 may include one or more of the following: (1) an SRS power measurement; (2) a channel impulse response for the wireless device 110; (3) an angle of arrival for the SRS 132; and/or (4) at least one previous signature vector 130 for the wireless device 110.

The method 400 proceeds to step 408 where a signature vector 130 is determined based on the at least one SRS metric 134 (from each receiving RP 106). The signature vector 130 may characterize the wireless device's 110 physical location. In some configurations, the SRS metric(s) 134 may be transmitted to the baseband controller 104, which aggregates the SRS metric(s) 134 and determines a signature vector 130. The signature vector 130 may be transmitted to the machine learning computing system 120, e.g., via the back-haul ETHERNET network 116A.

The method 400 proceeds to step 410 where the machine learning computing system 120 uses a machine learning model 124 to determine a physical location 129 of the wireless device 110 based on the signature vector 130 and the mapping data 124. Generally, the physical location for any wireless device 110 is determined by using the subsequent signature vector and the subsequent wireless device's 110 learned database of signature vectors 130 and the mapping data 124 (used to identify specific locations associated with the subsequent wireless device's 110 signature vectors 130).

In one example, step 410 may include the machine learning model 124 matching the signature vector 130 to a closest-matching signature vector 130 in the mapping data 124. In this example, the machine learning model 124 may identify a physical location 129 using pattern-matching, e.g., where the signature vector 130 may be thought of as a multi-parameter pattern that is matched to a closest pattern of a signature vector 130 in the mapping data 124.

The method 400 proceeds to optional step 412 where, in addition to determining a location of a wireless device 110 (e.g., determining a physical location without knowledge of a user's previous physical location), the wireless device 110 is tracked across a period of time, e.g., the wireless device's 110 current physical location is determined, at least in part, based on the wireless device's 110 previous physical location. For example, once a wireless device 110 is located, tracking may be performed by inputting further measurements (e.g., subsequent signature vectors 130), as well as at least one previous determined physical location 129, to the trained machine learning model 124.

The method 400 proceeds to optional step 414 where the physical location 129 is transmitted to the baseband controller 104 and/or a third-party services provider to enable at least one value-added service, e.g., spatio-temporal heat map generation, user movement pattern mining, and/or anomaly detection.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

In conclusion, the present disclosure provides novel systems, methods, and arrangements for location determination in a C-RAN utilizing image data. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Configurations

Example 1 includes a communication system that provides wireless service to at least one wireless device, comprising: a baseband controller communicatively coupled to a plurality of radio points and at least one image capture device at a site, wherein the baseband controller is configured to determine a signature vector for a wireless device associated with a first user; and a machine learning computing system configured to: determine an image-based location of the first user based on image data from the at least one image capture device; and determine mapping data that associates the signature vector with the image-based location of the first user.

Example 2 includes the communication system of Example 1, wherein the machine learning computing system is configured to determine the mapping data based on a primary RP in the signature vector.

Example 3 includes the communication system of any of Examples 1-2, wherein the machine learning computing system is configured to determine the mapping data based on a location of an image capture device that captured the image data used to determine the image-based location.

Example 4 includes the communication system of any of Examples 1-3, wherein the machine learning computing system is configured to determine the mapping data based on a timestamp of the signature vector and a timestamp of the image-based location of the first user.

Example 5 includes the communication system of any of Examples 1-4, wherein baseband controller is configured to determine the signature vector based on a sounding reference signal (SRS), received at the plurality of radio points, from the wireless device.

Example 6 includes the communication system of Example 5, wherein each of the plurality of radio points is configured to determine at least one SRS metric from the SRS and transmit the at least one SRS metric to the baseband controller.

Example 7 includes the communication system of Example 6, wherein the at least one SRS metric comprises an SRS power measurement, a channel impulse response measured from the SRS, or both.

Example 8 includes the communication system of any of Examples 1-7, wherein the mapping data comprises associations between a plurality of signature vectors and a plurality of image-based locations.

Example 9 includes the communication system of Example 8, wherein the machine learning computing system is further configured to determine a physical location for a subsequent wireless device based on a subsequent signature vector and the mapping data.

Example 10 includes the communication system of Example 9, wherein the machine learning computing system is further configured to determine the physical location for the subsequent wireless device by using the subsequent signature vector and the subsequent wireless device's learned database of signature vectors and matching locations.

Example 11 includes the communication system of any of Examples 1-10, wherein each image capture device is a video camera, a still camera, or both.

Example 12 includes a method for determining mapping data for a communication system, the communication system comprising a baseband controller and a plurality of radio points, wherein each radio point is configured to exchange radio frequency (RF) signals with a plurality of wireless devices, the method comprising: determining an image-based location of the first user based on image data from at least one image capture device; determining a signature vector for a wireless device associated with a first user; and determining the mapping data that associates the signature vector with the image-based location of the first user.

Example 13 includes the method of Example 12, wherein the mapping data is determined based on a primary RP in the signature vector.

Example 14 includes the method of any of Examples 12-13, wherein the mapping data is determined based on a location of an image capture device that captured the image data used to determine the image-based location.

Example 15 includes the method of any of Examples 12-14, wherein the mapping data is determined based on a timestamp of the signature vector and a timestamp of the image-based location of the first user.

Example 16 includes the method of any of Examples 12-15, wherein the signature vector is determined based on a sounding reference signal (SRS), received at the plurality of radio points, from the wireless device.

Example 17 includes the method of Example 16, wherein the determining the signature vector comprises determining, at each of the plurality of radio points, at least one SRS metric from the SRS and transmit the at least one SRS metric to the baseband controller.

Example 18 includes the method of Example 17, wherein the at least one SRS metric comprises an SRS power measurement, a channel impulse response measured from the SRS, or both.

Example 19 includes the method of any of Examples 12-18, wherein the mapping data comprises associations between a plurality of signature vectors and a plurality of image-based locations.

Example 20 includes the method of Example 19, further comprising determining a physical location for a subsequent wireless device based on a subsequent signature vector and the mapping data.

Example 21 includes the method of Example 20, wherein the physical location for the subsequent wireless device is determined by using the subsequent signature vector and the subsequent wireless device's learned database of signature vectors and matching locations.

Example 22 includes the method of any of Examples 12-21, wherein each image capture device is a video camera, a still camera, or both.

The invention claimed is:

1. A communication system that provides wireless service to at least one wireless device, comprising:
a baseband controller communicatively coupled to a plurality of radio points and at least one image capture device at a site, wherein the baseband controller is configured to determine a signature vector for a wireless device associated with a first user; and
a machine learning computing system configured to:
determine an image-based location of the first user based on image data from the at least one image capture device; and
determine mapping data that associates the signature vector with the image-based location of the first user.

2. The communication system of claim 1, wherein the machine learning computing system is configured to determine the mapping data based on a primary radio point in the signature vector.

3. The communication system of claim 1, wherein the machine learning computing system is configured to determine the mapping data based on a location of an image capture device that captured the image data used to determine the image-based location.

4. The communication system of claim 1, wherein the machine learning computing system is configured to determine the mapping data based on a timestamp of the signature vector and a timestamp of the image-based location of the first user.

5. The communication system of claim 1, wherein the baseband controller is configured to determine the signature vector based on a sounding reference signal (SRS), received at the plurality of radio points, from the wireless device.

6. The communication system of claim 5, wherein each of the plurality of radio points is configured to determine at least one SRS metric from the SRS and transmit the at least one SRS metric to the baseband controller.

7. The communication system of claim 6, wherein the at least one SRS metric comprises an SRS power measurement, a channel impulse response measured from the SRS, or both.

8. The communication system of claim 1, wherein the mapping data comprises associations between a plurality of signature vectors and a plurality of image-based locations.

9. The communication system of claim 8, wherein the machine learning computing system is further configured to determine a physical location for a subsequent wireless device based on a subsequent signature vector and the mapping data.

10. The communication system of claim 9, wherein the machine learning computing system is further configured to determine the physical location for the subsequent wireless device by using the subsequent signature vector and the subsequent wireless device's learned database of signature vectors and matching locations.

11. The communication system of claim 1, wherein each image capture device is a video camera, a still camera, or both.

12. A method for determining mapping data for a communication system, the communication system comprising a baseband controller and a plurality of radio points, wherein each radio point is configured to exchange radio frequency (RF) signals with a plurality of wireless devices, the method comprising:
    determining an image-based location of a first user based on image data from at least one image capture device;
    determining a signature vector for a wireless device associated with the first user; and
    determining the mapping data that associates the signature vector with the image-based location of the first user.

13. The method of claim 12, wherein the mapping data is determined based on a primary radio point in the signature vector.

14. The method of claim 12, wherein the mapping data is determined based on a location of an image capture device that captured the image data used to determine the image-based location.

15. The method of claim 12, wherein the mapping data is determined based on a timestamp of the signature vector and a timestamp of the image-based location of the first user.

16. The method of claim 12, wherein the signature vector is determined based on a sounding reference signal (SRS), received at the plurality of radio points, from the wireless device.

17. The method of claim 16, wherein the determining the signature vector comprises determining, at each of the plurality of radio points, at least one SRS metric from the SRS and transmit the at least one SRS metric to the baseband controller.

18. The method of claim 17, wherein the at least one SRS metric comprises an SRS power measurement, a channel impulse response measured from the SRS, or both.

19. The method of claim 12, wherein the mapping data comprises associations between a plurality of signature vectors and a plurality of image-based locations.

20. The method of claim 19, further comprising determining a physical location for a subsequent wireless device based on a subsequent signature vector and the mapping data.

21. The method of claim 20, wherein the physical location for the subsequent wireless device is determined by using the subsequent signature vector and the subsequent wireless device's learned database of signature vectors and matching locations.

22. The method of claim 12, wherein each image capture device is a video camera, a still camera, or both.

* * * * *